US 8,548,820 B2

(12) United States Patent
Matz et al.

(10) Patent No.: US 8,548,820 B2
(45) Date of Patent: *Oct. 1, 2013

(54) METHODS, SYSTEMS, AND PRODUCTS FOR TARGETING ADVERTISEMENTS

(75) Inventors: William R. Matz, Atlanta, GA (US); Scott R. Swix, Duluth, GA (US)

(73) Assignee: AT&T Intellecutal Property I. L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/491,685

(22) Filed: Jun. 8, 2012

(65) Prior Publication Data

US 2012/0246001 A1    Sep. 27, 2012

Related U.S. Application Data

(63) Continuation of application No. 12/508,653, filed on Jul. 24, 2009, now Pat. No. 8,219,411, which is a continuation of application No. 11/636,068, filed on Dec. 8, 2006, now Pat. No. 7,593,858, which is a continuation of application No. 10/017,640, filed on Dec. 14, 2001, now Pat. No. 7,212,979.

(51) Int. Cl.
G06Q 30/02 (2012.01)
G06Q 10/10 (2012.01)
G06Q 10/06 (2012.01)
G06Q 30/06 (2012.01)
G06Q 10/08 (2012.01)

(52) U.S. Cl.
USPC .......................................................... 705/1.1

(58) Field of Classification Search
None
See application file for complete search history.

(56) References Cited

U.S. PATENT DOCUMENTS

| | | | |
|---|---|---|---|
| 3,798,610 A | 3/1974 | Bliss et al. |
| 3,886,302 A | 5/1975 | Kosco |
| 3,924,187 A | 12/1975 | Dormans |
| 4,130,833 A | 12/1978 | Chomet |
| 4,258,386 A | 3/1981 | Cheung |
| 4,361,851 A | 11/1982 | Asip et al. |
| 4,488,179 A | 12/1984 | Kruger et al. |
| 4,566,030 A | 1/1986 | Nickerson et al. |
| 4,567,591 A | 1/1986 | Gray et al. |
| 4,598,288 A | 7/1986 | Yarbrough et al. |
| 4,602,279 A | 7/1986 | Freeman |
| 4,688,248 A | 8/1987 | Tomizawa |
| 4,689,661 A | 8/1987 | Barbieri et al. |
| 4,697,209 A | 9/1987 | Kiewit et al. |
| 4,698,670 A | 10/1987 | Matty |

(Continued)

FOREIGN PATENT DOCUMENTS

EP    0 424 648    2/1991
EP    1 162 840    12/2001

(Continued)

OTHER PUBLICATIONS

U.S. Appl. No. 08/779,306, Grauch.

(Continued)

Primary Examiner — Jonathan Ouellette
(74) Attorney, Agent, or Firm — Scott P. Zimmerman, PLLC

(57) ABSTRACT

Methods, systems, and products target advertisements to users. Clickstream data is received and compared to a purchase history. When a common attribute is determined, an advertisement associated with the attribute is retrieved and targeted to a user.

20 Claims, 7 Drawing Sheets

(56) References Cited

U.S. PATENT DOCUMENTS

| | | |
|---|---|---|
| 4,720,873 A | 1/1988 | Goodman et al. |
| 4,816,904 A | 3/1989 | McKenna et al. |
| 4,885,632 A | 12/1989 | Mabey et al. |
| 4,890,322 A | 12/1989 | Russell, Jr. |
| 4,912,552 A | 3/1990 | Allison |
| 5,010,585 A | 4/1991 | Garcia |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | VonKohorn |
| 5,251,324 A | 10/1993 | McMullan, Jr. |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,382,970 A | 1/1995 | Kiefl |
| 5,389,964 A | 2/1995 | Oberle |
| 5,404,393 A | 4/1995 | Remillard |
| 5,410,326 A | 4/1995 | Goldstein |
| 5,410,344 A | 4/1995 | Graves |
| 5,436,653 A | 7/1995 | Ellis et al. |
| 5,440,334 A | 8/1995 | Walters et al. |
| 5,444,499 A | 8/1995 | Saitoh |
| 5,446,490 A | 8/1995 | Blahut et al. |
| 5,446,919 A | 8/1995 | Wilkins |
| 5,481,294 A | 1/1996 | Thomas et al. |
| 5,497,185 A | 3/1996 | Dufresne et al. |
| 5,500,681 A | 3/1996 | Jones |
| 5,504,519 A | 4/1996 | Remillard |
| 5,532,732 A | 7/1996 | Yuen et al. |
| 5,532,735 A | 7/1996 | Blahut et al. |
| 5,534,911 A | 7/1996 | Levitan |
| 5,537,143 A | 7/1996 | Steingold et al. |
| 5,559,548 A | 9/1996 | Davis |
| 5,579,124 A | 11/1996 | Aijala et al. |
| 5,585,838 A | 12/1996 | Lawler et al. |
| 5,585,865 A | 12/1996 | Amano |
| 5,589,892 A | 12/1996 | Knee et al. |
| 5,596,994 A | 1/1997 | Bro |
| 5,600,364 A | 2/1997 | Hendricks |
| 5,600,366 A | 2/1997 | Schulman |
| 5,606,359 A | 2/1997 | Youden et al. |
| 5,606,602 A | 2/1997 | Johnson et al. |
| 5,608,448 A | 3/1997 | Smoral et al. |
| 5,619,247 A | 4/1997 | Russo |
| 5,630,119 A | 5/1997 | Aristides |
| 5,649,200 A | 7/1997 | Leblang et al. |
| 5,659,350 A | 8/1997 | Hendricks |
| 5,661,516 A | 8/1997 | Carles |
| 5,710,815 A | 1/1998 | Ming et al. |
| 5,721,827 A | 2/1998 | Logan |
| 5,724,521 A | 3/1998 | Dedrick |
| 5,724,525 A | 3/1998 | Beyers, II et al. |
| 5,724,607 A | 3/1998 | Brandt |
| 5,740,549 A | 4/1998 | Reilly et al. |
| 5,752,159 A | 5/1998 | Faust et al. |
| 5,754,775 A | 5/1998 | Adamson et al. |
| 5,754,939 A | 5/1998 | Herz |
| 5,758,257 A | 5/1998 | Herz |
| 5,758,259 A | 5/1998 | Lawler |
| 5,774,170 A | 6/1998 | Hite et al. |
| 5,777,614 A | 7/1998 | Ando et al. |
| 5,778,182 A | 7/1998 | Cathey et al. |
| 5,794,210 A | 8/1998 | Goldhaber et al. |
| 5,796,952 A | 8/1998 | Davis et al. |
| 5,798,785 A | 8/1998 | Hendricks et al. |
| 5,809,481 A | 9/1998 | Baron et al. |
| 5,818,438 A | 10/1998 | Howe |
| 5,838,314 A | 11/1998 | Neel |
| 5,848,396 A | 12/1998 | Gerace |
| 5,848,397 A | 12/1998 | Marsh et al. |
| 5,850,249 A | 12/1998 | Massetti et al. |
| 5,850,447 A | 12/1998 | Peyret |
| 5,854,897 A | 12/1998 | Radziewicz et al. |
| 5,861,906 A | 1/1999 | Dunn |
| 5,867,226 A | 2/1999 | Wehmeyer et al. |
| 5,872,588 A | 2/1999 | Aras et al. |
| 5,872,834 A | 2/1999 | Teitelbaum et al. |
| 5,883,942 A | 3/1999 | Lim et al. |
| 5,892,508 A | 4/1999 | Howe |
| 5,892,536 A | 4/1999 | Logan |
| 5,901,209 A | 5/1999 | Tannhenbaum et al. |
| 5,917,481 A | 6/1999 | Rzeszewski |
| 5,931,908 A | 8/1999 | Gerba et al. |
| 5,945,988 A | 8/1999 | Williams et al. |
| 5,946,636 A | 8/1999 | Uyeno et al. |
| 5,948,061 A | 9/1999 | Merriman et al. |
| 5,973,683 A | 10/1999 | Cragun |
| 5,983,227 A | 11/1999 | Nazem |
| 5,991,735 A | 11/1999 | Gerace |
| 5,991,799 A | 11/1999 | Yen et al. |
| 6,002,393 A | 12/1999 | Hite |
| 6,005,597 A | 12/1999 | Barrett |
| 6,026,368 A | 2/2000 | Brown et al. |
| 6,029,045 A | 2/2000 | Picco et al. |
| 6,029,195 A | 2/2000 | Herz |
| 6,076,094 A | 6/2000 | Cohen |
| 6,081,840 A | 6/2000 | Zhao |
| 6,100,916 A | 8/2000 | August |
| 6,119,098 A | 9/2000 | Guyot et al. |
| 6,128,009 A | 10/2000 | Ohkura et al. |
| 6,134,531 A | 10/2000 | Trewitt et al. |
| 6,134,532 A | 10/2000 | Lazarus |
| 6,160,570 A | 12/2000 | Sitnik |
| 6,163,644 A | 12/2000 | Owashi et al. |
| 6,172,674 B1 | 1/2001 | Ethridge |
| 6,177,931 B1 | 1/2001 | Alexander et al. |
| D437,879 S | 2/2001 | Weinandt |
| 6,185,614 B1 | 2/2001 | Cuomo |
| 6,199,076 B1 | 3/2001 | Logan et al. |
| 6,202,210 B1 | 3/2001 | Judtke |
| 6,226,618 B1 | 5/2001 | Downs et al. |
| 6,236,975 B1 | 5/2001 | Boe et al. |
| 6,252,586 B1 | 6/2001 | Freeman et al. |
| 6,253,189 B1 | 6/2001 | Feezell et al. |
| 6,279,157 B1 | 8/2001 | Takasu |
| 6,282,713 B1 | 8/2001 | Kitsukawa |
| 6,286,042 B1 | 9/2001 | Hasselberg et al. |
| 6,292,549 B1 | 9/2001 | Lung et al. |
| 6,304,644 B2 | 10/2001 | Karnowski |
| 6,310,943 B1 | 10/2001 | Kowlaski |
| 6,314,568 B1 | 11/2001 | Ochiai |
| 6,314,577 B1 | 11/2001 | Pocock |
| 6,317,488 B1 | 11/2001 | DePond et al. |
| 6,324,271 B1 | 11/2001 | Sawyer et al. |
| 6,327,574 B1 | 12/2001 | Kramer et al. |
| 6,332,021 B2 | 12/2001 | Latter et al. |
| 6,338,043 B1 | 1/2002 | Miller |
| 6,339,639 B1 | 1/2002 | Henderson |
| 6,341,161 B1 | 1/2002 | Latter et al. |
| 6,345,187 B1 | 2/2002 | Berthoud et al. |
| 6,345,256 B1 | 2/2002 | Milsted et al. |
| 6,351,637 B1 | 2/2002 | Lee |
| 6,353,929 B1 | 3/2002 | Houston |
| 6,366,772 B1 | 4/2002 | Arnson |
| 6,397,057 B1 | 5/2002 | Malackowski et al. |
| 6,400,408 B1 | 6/2002 | Berger |
| 6,408,437 B1 | 6/2002 | Hendricks et al. |
| 6,427,003 B1 | 7/2002 | Corbett |
| 6,434,747 B1 | 8/2002 | Khoo et al. |
| 6,438,216 B1 | 8/2002 | Aktas |
| 6,442,262 B1 | 8/2002 | Moss et al. |
| 6,442,263 B1 | 8/2002 | Beaton et al. |
| 6,445,781 B1 | 9/2002 | Heinmiller et al. |
| 6,446,261 B1 | 9/2002 | Rosser |
| 6,457,010 B1 | 9/2002 | Eldering |
| 6,463,468 B1 | 10/2002 | Bush |

| | | | | | | |
|---|---|---|---|---|---|---|
| 6,463,585 B1 | 10/2002 | Hendricks et al. | 7,444,658 B1 | 10/2008 | Matz | |
| 6,477,704 B1 | 11/2002 | Cremia | 7,587,323 B2 | 9/2009 | Matz | |
| 6,480,589 B1 | 11/2002 | Lee et al. | 7,587,732 B2 | 9/2009 | Wright et al. | |
| 6,487,538 B1 | 11/2002 | Gupta et al. | 7,593,858 B2 | 9/2009 | Matz | |
| 6,493,439 B2 | 12/2002 | Lung et al. | 7,617,508 B2 | 11/2009 | Gray | |
| 6,496,569 B2 | 12/2002 | Pelletier et al. | 7,661,118 B2 | 2/2010 | Matz | |
| 6,496,571 B1 | 12/2002 | Wilson | 2001/0004733 A1 | 6/2001 | Eldering | |
| 6,496,818 B1 | 12/2002 | Ponte | 2002/0002488 A1* | 1/2002 | Muyres et al. | 705/14 |
| 6,498,841 B2 | 12/2002 | Bull et al. | 2002/0004382 A1 | 1/2002 | Cox et al. | |
| 6,505,348 B1 | 1/2003 | Knowles | 2002/0009184 A1 | 1/2002 | Shnier | |
| 6,507,839 B1 | 1/2003 | Ponte | 2002/0013757 A1 | 1/2002 | Bykowsky | |
| 6,510,417 B1 | 1/2003 | Woods et al. | 2002/0016748 A1 | 2/2002 | Emodi et al. | |
| 6,529,591 B1 | 3/2003 | Dosani et al. | 2002/0016964 A1 | 2/2002 | Aratani et al. | |
| 6,530,082 B1 | 3/2003 | DelSesto et al. | 2002/0032906 A1 | 3/2002 | Grossman | |
| 6,542,583 B1 | 4/2003 | Taylor | 2002/0035600 A1 | 3/2002 | Ullman et al. | |
| 6,542,591 B1 | 4/2003 | Amro et al. | 2002/0046099 A1 | 4/2002 | Frengut et al. | |
| 6,546,092 B2 | 4/2003 | Corbett et al. | 2002/0049631 A1 | 4/2002 | Williams | |
| 6,553,110 B1 | 4/2003 | Peng | 2002/0049967 A1 | 4/2002 | Haseltine et al. | |
| 6,553,178 B2 | 4/2003 | Abecassis | 2002/0056109 A1 | 5/2002 | Tomsen | |
| 6,560,317 B1 | 5/2003 | Quagliana | 2002/0056118 A1 | 5/2002 | Hunter et al. | |
| 6,560,327 B1 | 5/2003 | McConnell | 2002/0078443 A1 | 6/2002 | Gadkari et al. | |
| 6,570,971 B2 | 5/2003 | Latter et al. | 2002/0083441 A1 | 6/2002 | Flickinger et al. | |
| 6,571,344 B1 | 5/2003 | Sitnik | 2002/0087573 A1 | 7/2002 | Reuning et al. | |
| 6,574,319 B2 | 6/2003 | Latter et al. | 2002/0090933 A1 | 7/2002 | Rouse et al. | |
| 6,584,490 B1 | 6/2003 | Schuster et al. | 2002/0092017 A1 | 7/2002 | Klosterman et al. | |
| 6,631,181 B1 | 10/2003 | Bates et al. | 2002/0092019 A1 | 7/2002 | Marcus | |
| 6,631,360 B1 | 10/2003 | Cook | 2002/0100064 A1 | 7/2002 | Ward et al. | |
| 6,639,979 B1 | 10/2003 | Kim | 2002/0122401 A1 | 9/2002 | Xiang et al. | |
| 6,647,548 B1 | 11/2003 | Lu et al. | 2002/0123928 A1 | 9/2002 | Eldering et al. | |
| 6,650,743 B2 | 11/2003 | Heinmiller et al. | 2002/0133817 A1 | 9/2002 | Markel | |
| 6,675,383 B1 | 1/2004 | Wheeler et al. | 2002/0143647 A1 | 10/2002 | Headings | |
| 6,698,020 B1 | 2/2004 | Zigmond et al. | 2002/0157108 A1 | 10/2002 | Kitsukawa et al. | |
| 6,714,992 B1 | 3/2004 | Kanojia et al. | 2002/0157109 A1 | 10/2002 | Nakano et al. | |
| 6,718,021 B2 | 4/2004 | Crockett et al. | 2002/0169709 A1 | 11/2002 | Kitayama | |
| 6,718,551 B1 | 4/2004 | Swix et al. | 2002/0183098 A1 | 12/2002 | Lee et al. | |
| 6,728,355 B2 | 4/2004 | Kowalski | 2002/0191755 A1 | 12/2002 | Lew et al. | |
| 6,731,727 B2 | 5/2004 | Corbett et al. | 2002/0199197 A1 | 12/2002 | Winter | |
| 6,738,978 B1 | 5/2004 | Hendricks et al. | 2003/0003990 A1 | 1/2003 | Von Kohorn | |
| 6,748,058 B1 | 6/2004 | Schwend et al. | 2003/0028432 A1 | 2/2003 | Troyansky et al. | |
| 6,748,068 B1 | 6/2004 | Walsh et al. | 2003/0028873 A1 | 2/2003 | Lemmons | |
| 6,757,691 B1 | 6/2004 | Welsh et al. | 2003/0049967 A1 | 3/2003 | Narumo et al. | |
| 6,766,003 B2 | 7/2004 | Moss et al. | 2003/0050100 A1 | 3/2003 | Dent | |
| 6,766,524 B1 | 7/2004 | Matheny et al. | 2003/0067554 A1 | 4/2003 | Klarfeld | |
| D494,953 S | 8/2004 | Leung | 2003/0092384 A1 | 5/2003 | Ross, III | |
| 6,771,754 B2 | 8/2004 | Pelletier et al. | 2003/0093792 A1 | 5/2003 | Labeeb et al. | |
| 6,771,755 B1 | 8/2004 | Simpson | 2003/0095650 A1 | 5/2003 | Mize | |
| 6,772,209 B1 | 8/2004 | Chernock | 2003/0108184 A1 | 6/2003 | Brown et al. | |
| 6,785,301 B1 | 8/2004 | Chapman et al. | 2003/0110489 A1 | 6/2003 | Gudorf et al. | |
| 6,785,368 B1 | 8/2004 | Eason et al. | 2003/0110497 A1 | 6/2003 | Yassin et al. | |
| 6,798,879 B1 | 9/2004 | Beham | 2003/0115597 A1 | 6/2003 | Yassin et al. | |
| 6,807,267 B2 | 10/2004 | Moss et al. | 2003/0148758 A1 | 8/2003 | McMullin | |
| 6,810,115 B2 | 10/2004 | Fukuda | 2003/0149975 A1 | 8/2003 | Eldering et al. | |
| 6,810,527 B1 | 10/2004 | Conrad et al. | 2003/0172374 A1 | 9/2003 | Vinson et al. | |
| 6,816,481 B1 | 11/2004 | Adams et al. | 2004/0125929 A1 | 7/2004 | Pope | |
| 6,826,271 B1 | 11/2004 | Kanabar et al. | 2004/0128682 A1 | 7/2004 | Liga et al. | |
| 6,831,974 B1 | 12/2004 | Watson et al. | 2004/0133467 A1 | 7/2004 | Siler | |
| 6,845,151 B2 | 1/2005 | Peng | 2004/0163101 A1 | 8/2004 | Swix | |
| 6,845,396 B1 | 1/2005 | Kanojia | 2004/0193483 A1 | 9/2004 | Wolan | |
| 6,845,398 B1 | 1/2005 | Galensky | 2004/0193488 A1 | 9/2004 | Khoo et al. | |
| 6,850,988 B1 | 2/2005 | Reed | 2004/0194131 A1 | 9/2004 | Ellis et al. | |
| 6,950,804 B2 | 9/2005 | Strietzel | 2004/0248560 A1 | 12/2004 | Bedingfield et al. | |
| 6,970,641 B1 | 11/2005 | Pierre | 2004/0261127 A1 | 12/2004 | Freeman et al. | |
| 6,976,268 B2 | 12/2005 | Courtney | 2005/0060759 A1 | 3/2005 | Rowe et al. | |
| 6,983,478 B1 | 1/2006 | Grauch et al. | 2005/0071863 A1 | 3/2005 | Matz | |
| 6,985,882 B1 | 1/2006 | Del Sesto | 2005/0084084 A1 | 4/2005 | Cook et al. | |
| 7,000,245 B1 | 2/2006 | Pierre | 2005/0132419 A1 | 6/2005 | Gray | |
| 7,010,492 B1 | 3/2006 | Bassett et al. | 2005/0137958 A1 | 6/2005 | Huber et al. | |
| 7,020,336 B2 | 3/2006 | Cohen-Solal | 2005/0235318 A1 | 10/2005 | Grauch | |
| 7,020,652 B2 | 3/2006 | Matz | 2005/0251820 A1 | 11/2005 | Stefanik | |
| 7,039,599 B2 | 5/2006 | Merriman | 2005/0278741 A1 | 12/2005 | Robarts et al. | |
| 7,039,932 B2 | 5/2006 | Eldering | 2005/0283401 A1 | 12/2005 | Swix | |
| 7,086,075 B2 | 8/2006 | Swix | 2005/0283792 A1 | 12/2005 | Swix | |
| 7,100,183 B2 | 8/2006 | Kunkel et al. | 2006/0031882 A1 | 2/2006 | Swix | |
| 7,212,979 B1 | 5/2007 | Matz et al | 2006/0075456 A1 | 4/2006 | Gray | |
| 7,228,283 B1 | 6/2007 | Hornstein | 2006/0106710 A1 | 5/2006 | Meek et al. | |
| 7,260,823 B2 | 8/2007 | Schlack et al. | 2006/0161952 A1 | 7/2006 | Herz et al. | |
| 7,269,835 B2 | 9/2007 | Swix | 2006/0168616 A1 | 7/2006 | Candelore | |
| 7,343,354 B2 | 3/2008 | Hennessey | 2006/0253884 A1 | 11/2006 | Gray | |
| 7,441,260 B1 | 10/2008 | Kurapati | 2006/0271438 A1 | 11/2006 | Shotland et al. | |

| | | |
|---|---|---|
| 2006/0271552 A1 | 11/2006 | McChesney et al. |
| 2006/0288367 A1 | 12/2006 | Swix |
| 2007/0038514 A1 | 2/2007 | Patterson et al. |
| 2007/0083885 A1 | 4/2007 | Harding |
| 2007/0226761 A1 | 9/2007 | Zalewski et al. |
| 2007/0250846 A1 | 10/2007 | Swix |
| 2007/0255622 A1 | 11/2007 | Swix |
| 2008/0004962 A1 | 1/2008 | Muthukrishnan et al. |
| 2008/0104634 A1 | 5/2008 | Gajdos et al. |
| 2008/0147497 A1 | 6/2008 | Tischer |
| 2008/0148311 A1 | 6/2008 | Tischer |
| 2008/0167943 A1 | 7/2008 | O'Neil |
| 2008/0263586 A1 | 10/2008 | Thomas |
| 2009/0292703 A1 | 11/2009 | Matz |
| 2010/0083298 A1 | 4/2010 | Gray |
| 2010/0088725 A1 | 4/2010 | Swix |
| 2010/0191601 A1 | 7/2010 | Matz |
| 2010/0257037 A1 | 10/2010 | Matz |

FOREIGN PATENT DOCUMENTS

| | | |
|---|---|---|
| WO | WO 9222983 | 12/1992 |
| WO | WO 94 17609 | 8/1994 |
| WO | WO 96 07270 | 3/1996 |
| WO | WO 98 31114 | 7/1998 |
| WO | WO 99 04561 | 1/1999 |
| WO | WO 99 45702 | 10/1999 |
| WO | WO 99 52285 | 10/1999 |
| WO | WO 0147156 | 6/2001 |
| WO | WO 03/052551 | 6/2003 |

OTHER PUBLICATIONS

U.S. Appl. No. 10/039,062, Matz.

U.S. Appl. No. 10/020,779, Swix.

www.actv.com, Screen Print, Oct. 8, 2000.

"ACTV, Inc. Offers Exclusive Preview of 'Individualized Television' at Official All-Star Café," Business Wire, Sep. 16, 1998.

"ACTV's HyperTV & 'Individualized Television' to be Powered by Sun Microsystems' JavaTV Technology," Business Wire, Apr. 21, 1999.

Whitaker, Jerry, "Interactive TV: Killer Ap or Technical Curiosity?", Broadcast Engineering, Dec. 1999.

Dickson, Glen, "Digital TV gets specifically directed," Broadcasting & Cable, Jun. 5, 2000.

Reed, David, "The future is digital," Precision Marketing, v. 13, n. 51, p. 27, Sep. 21, 2001.

Wasserman, Todd, "Mining Everyone's Business." Brandweek, Feb. 28, 2000. 19 pages.

Cauley, Leslie, "Microsoft, Baby Bell Form Video Alliance," *The Wall Street Journal*, Sep. 26, 1994.

"allNetDevices:—Report: Interactive TV Soon to Become Direct Marketing Tool," allNetDevices, www.devices.internet.com/com_cgi/print/print.cgi?url=http://devices.../report_interactive.html, (Nov. 16, 2001) pp. 1-2.

"Liberate Technologies—Solutions," Digital Cable Two-Way, www.solutions.liberate.com/architecture/dc2.html, (Nov. 16, 2001) p. 1 of 1.

"Liberate Technologies—Solutions," Digital Broadband Telco, www.solutions.liberate.com/architecture/db.html, (Nov. 16, 2001) p. 1 of 1.

"Liberate Technologies—Solutions," Liberate Connect Suite, www.solutions.liberate.com/products/connect_suite.html, (Nov. 16, 2001) pp. 1-2.

"Liberate Technologies—Solutions," Liberate imprint Server ™, www.solutions.liberate.com/products/imprint_server.html, (Nov. 16, 2001) p. 1 of 1.

"Liberate Technologies—Solutions," Liberate Mediacast Server™, www.solutions.liberate.com/products/mediacast_server.html, (Nov. 16, 2001) pp. 1-2.

"Spike High Performance Server Array," Mixed Signals Technologies, Inc., www.mixedsignals.com, itvinfo@mixedsignals.com (2000) p. 1.

"power, flexibility, and control," RespondTV, www.respondtv.com/whyrespond.html (Nov. 16, 2001) pp. 1-2.

"It just clicks!," RespondTV, www.respondtv.com/inaction.html, (Nov. 16, 2001) pp. 1-2.

"The Wink System," Wink System Diagram, www.wink.com/contents/tech_diagram.html, (Nov. 16, 2001) p. 1 of 1.

"What is Wink?," www.wink.com/contents/whatiswink.html, (Nov. 16, 2001) p. 1 of 1.

"How Wink Works," What is Wink: How wink works, www.wink.com/contents/howitworks.html, (Nov. 16, 2001) p. 1 of 1.

"What is Wink: Examples," What is Wink—Examples, www.wink.com/contents/examples.html, (Nov. 16, 2001) pp. 1-2.

"Nielsen Media Research—Who We Are & What We Do," www.nielsenmedia.com/whoweare.html, (Oct. 11, 2001) pp. 1-4.

Aggarwal et al ("A Framework for the Optimizing of WWW Advertising" Proceedings of the International IFIP/GI Working Conference Trends in Distributed Systems for Electronic Commerce, pp. 1-10, Year of Publication: 1998).

Ehrmantraut et al., "The Personal Electronic Program Guide—Towards the Pre-selection of Individual TV Programs", pp. 1-8, 1996.

\* cited by examiner

| Time | | Content |
|---|---|---|
| 1:00 | :00 | NCAA Basketball |
| | :15 | NCAA Basketball, Local News Ad, Sporting Goods Ad 1, Sporting Event Ad |
| | :30 | NCAA Basketball |
| | :45 | NCAA Basketball, Automobile Ad 1 |
| 2:00 | :00 | NCAA Basketball |
| | :15 | NCAA Basketball, Sports Ad, Sports Drink Ad, Automobile Ad 2, PGA Golf Tournament |
| | :30 | DVD Movie – Science Fiction |
| | :45 | DVD Movie – Science Fiction |
| 3:00 | :00 | DVD Movie – Science Fiction |
| | :15 | DVD Movie – Science Fiction |
| | :30 | DVD Movie – Science Fiction |
| | :45 | DVD Movie – Science Fiction |
| 4:00 | :00 | DVD Movie – Science Fiction |
| | :15 | NBA Basketball, Automobile Ad 3, Credit Card Ad 1, Airline Ad 1 |
| | :30 | NBA Basketball |
| | :45 | NBA Basketball, Tourism Ad 4, Restaurant Ad, Sporting Goods Ad 2 |
| 5:00 | :00 | NBA Basketball |
| | :15 | NBA Basketball, Local Retailer Ad. Sporting Goods Ad 1 |
| | :30 | NBA Basketball |
| | :45 | NBA Basketball, Airline Ad 1, Automobile Ad 4, Credit Card Ad 2 |
| | :00 | NBA Basketball |

FIG. 5

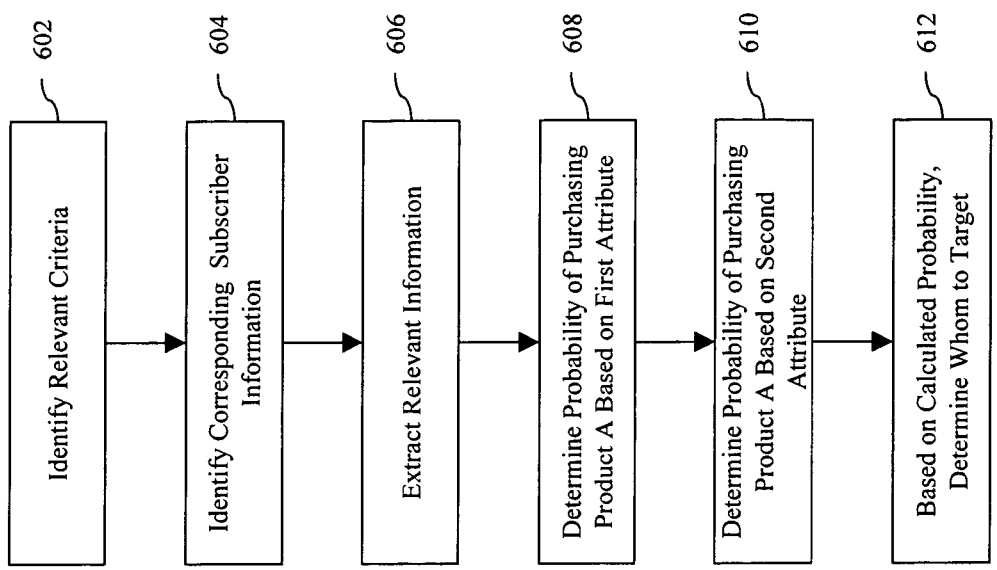

Subscriber Information Database Extract

| Viewing Pattern | City | Purchase Product A |
|---|---|---|
| Show 1 | A | Yes |
| Show 2 | A | Yes |
| Show 3 | A | No |
| Show 1 | B | Yes |
| Show 2 | B | No |
| Show 3 | B | No |
| Show 1 | C | No |
| Show 2 | C | Yes |
| Show 3 | C | No |

FIG. 7A

Probability of Purchasing Product A

| Viewing History | Probability (%) |
|---|---|
| Show 1 | 66.7 |
| Show 2 | 50.0 |
| Show 3 | 0.0 |

FIG. 7B

Probability of Purchasing Product A

| City | Probability (%) |
|---|---|
| A | 66.7 |
| B | 33.3 |
| C | 33.3 |

FIG. 7C

METHODS, SYSTEMS, AND PRODUCTS FOR TARGETING ADVERTISEMENTS

CROSS REFERENCES TO RELATED APPLICATIONS

This application is a continuation of U.S. application Ser. No. 12/508,653, filed Jul. 24, 2009, and now issued as U.S. Pat. No. 8,219,411, which is a continuation of U.S. application Ser. No. 11/636,068, filed Dec. 8, 2006, and now issued as U.S. Pat. No. 7,593,858, which is a continuation of U.S. application Ser. No. 10/017,640, filed Dec. 14, 2001, and now issued as U.S. Pat. No. 7,212,979, with all applications incorporated herein by reference in their entireties.

This application also relates to U.S. application Ser. No. 09/496,825, filed Feb. 1, 2000, now abandoned, but incorporated herein by reference in its entirety.

This application relates to U.S. application Ser. No. 10/017,742 entitled a "System and Method for Identifying Desirable Subscribers," filed on Dec. 14, 2001, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to the measurement of content-access patterns, and, more particularly, relate to utilizing content-access patterns and other subscriber-specific information to identify desirable subscribers.

Content providers derive revenue directly or indirectly from subscribers. Therefore, content providers, including, for example, advertisers, content creators, and content distributors strive to identify desirable subscribers. A subscriber may be desirable for any number of reasons. For example, a subscriber may be desirable due to past spending nor viewing patterns, which indicate a propensity for exhibiting a related behavior that the content provider considers desirable. For example, the subscriber may also be desirable due to the subscriber's demographic profile, including the subscriber's age, income, or other attribute. A desirable subscriber is a subscriber who is likely to make a decision to purchase a product or service or to view a provider's content.

Content providers utilize various methods to identify desirable subscribers, such as monitoring the subscriber's content-access patterns and performing surveys to determine a subscriber's demographic profile. For example, a television-programming provider may implement a program of voluntary logging of television viewing by a viewer, followed by transmission and human processing to analyze the information contained in the log. In addition, a provider may utilize telephone, mail, or other types of surveys to inquire from random or selected viewers about the viewers; viewing habits and requests their recollections regarding their viewing patterns. A provider may also utilize automated monitoring systems that attempt to intercept television channel choices and changes, record these events, and provide the recording to a clearinghouse or other facility for further processing.

The provider may enlist a ratings company to perform the monitoring and processing. For example, Nielsen Media Research (Nielsen Media Research, Inc., New York, N.Y.), Arbitron (Arbitron Inc., New York, N.Y.), and MeasureCast (MeasureCast, Inc., Portland, Oreg.) provide third-party monitoring and processing capability for television, radio, and Internet content.

The Nielsen Media Research (Nielsen) Ratings are perhaps the best known of the various third-party ratings services. Nielsen utilizes a variety of conventional sampling methods to determine the number of viewers watching a particular show. For example, in five thousand homes, Nielsen installs a People Meter. The People Meter records viewing patterns from television sets, cable television set-top boxes, videocassette recorders, satellite television set-top boxes, and other sources of television programming. The People Meter records what content the particular device is providing on an ongoing basis and periodically transmits this information to servers within a Nielsen facility. Nielsen combines the data uploaded from the People Meter with media content data to determine what programming and advertising a device displayed. Nielsen uses the combined data to provide a rating for each program and advertisement. In conjunction with the People Meter, Nielsen also utilizes viewer diaries and surveys to gather information from a broader spectrum of television viewers and to confirm the results generated by the People Meter.

Arbitron, Inc. (Arbitron) is well known for providing radio broadcast ratings. Arbitron compiles ratings by utilizing surveys. Arbitron also provides television ratings based on various sampling techniques. In cooperation with Nielsen, Arbitron has developed a Portable People Meter to measure television ratings. The portable People Meter is a pager-sized device, worn by a participant in a survey. The Portable People Meter records viewing by recording sounds encoded into each broadcast, which identify the program or advertisement. The survey participant periodically plugs the Portable People Meter into a recharger, which also includes a communicator that uploads the data in the Portable People Meter into a remote Arbitron server. The Portable People Meter may be a more accurate method of television ratings than a set-top box, such as the set-top box used by Nielsen. The Portable People Meter offers the advantage of capturing viewing outside the home and of recognizing when the viewer is not within audible range of a television, and therefore, less likely to be viewing a particular program or advertisement.

As the use of the Internet increases, the distribution of programming via Internet channels becomes more important. MeasureCast, Inc. (MeasureCast) provides a ratings system for Internet media streaming. MeasureCast records the number of streams requested from a streaming server and provides reports to programming providers and advertisers detailing the popularity of particular streams. As is the case in traditional broadcast media, the more popular the stream, the higher the advertising rate a broadcaster is able to charge.

Nielsen, Arbitron, and MeasureCast provide direct methods of measuring the popularity of a program. Various indirect methods are also used to determine the popularity of programming and the effectiveness of advertising. For example, advertising effectiveness is often measured in terms of viewer attitudes and subsequent viewer actions, such as purchases, inquiries, behavior changes, and other actions. Methods of obtaining these indirect measures include: focus group tests, post-advertising surveys questioning whether an advertisement was viewed, remembered and possible impact, and measures of product purchases or other indirect results that may indicate whether or not an advertising campaign has been successful.

Conventional methods for identifying desirable subscribers are inefficient and ineffective in identify specific subscribers or small groups of subscribers to which a content provider can direct resources. For example, conventional systems, such as the Nielsen and Arbitron meters, rely on small samples, which may not be representative of the target market for a particular content provider. Conventional methods for identifying desirable subscribers also lack an efficient means for matching the demographics, content-access patterns, spending habits, and other attributes with specific subscribers on a large-scale basis. Therefore, subscribers are targeted as generalized groups, rather than accurately targeted as individuals or as members of small, homogenous groups.

Also, surveys are expensive and highly dependent on identifying individuals that are of interest to the particular content provider sponsoring the survey. Post-advertising results measurements suffer from questions of causality and external influences. Focus groups allow reasonably efficient low-volume viewer analysis, but statistical analysis requires an adequate number of participants and tightly controlled tests, a combination that may be difficult to achieve.

Also, because of comprehensive information about a subscriber is unavailable, it may be difficult or impossible in conventional systems to determine a causal link between a particular viewing pattern or attribute and an action. A subscriber may show an interest in a category, but the interest may not lead to an action. The content provider has no direct way of determining the causal link. For example, a subscriber may view many automobile programs or advertisements but never purchase a new automobile. A different subscriber may purchase new automobiles regularly yet never watch a program or advertisement devoted to automobiles. Establishing the causal link is of great value to the content provider.

SUMMARY

Exemplary embodiments provide systems and methods for utilizing information relating to a subscriber to identify the subscriber as desirable. According to some of the embodiments, a computerized system includes a content-access information database, a subscriber attribute database, and a subscriber information database. The computerized system may also include a merge processor to merge information from the content access information and subscriber attribute databases to create data in the subscriber information database. The computerized system may also include a data analyzer electronically connected to the subscriber information database. The analyzer allows a content provider to access subscriber information to determine patterns of content access and to correlate these patterns with additional subscriber information.

According to exemplary embodiments, the subscriber attribute database includes information associated with a subscriber that allows content providers to identify the subscriber as a desirable subscriber. For example, in some of the embodiments, the subscriber attribute database includes a purchase history for the subscriber, such as a credit card database. The purchase history may include purchases of the content provider's products and/or services and may include purchases of products and/or services, which are complementary to or competitive with the content provider's products and/or services. In other exemplary embodiments, the subscriber attribute database includes a property-ownership database. In yet another exemplary embodiment, the subscriber attribute database includes a survey result or questionnaire response database.

The data analyzer in an exemplary embodiment includes a tool used by content providers to identify desirable subscribers. The data analyzer may include a report creator, a multi-dimensional database, and/or a data-mining application. A data-mining application allows a user to derive new information or discover new patterns in datasets.

In an exemplary embodiment, the content provider or other user wishing to identify desirable subscribers receives viewing information associated with a subscriber, receives subscriber attributes, merges the received information into a single dataset, and then analyzes the dataset to identify the subscribers. The subscriber may be desirable as a consumer or for some other purpose of value to the provider performing analysis of the data.

The viewing information may include programming and/or advertising data. The viewing information may also identify the time-of-day, duration and/or other distinguishing characteristics of the subscriber's viewing patterns.

According to some of the embodiments includes a computer-readable medium on which is encoded computer program code for utilizing information on relating to a subscriber in order to identify the subscriber as a desirable subscriber.

According to some of the embodiments offers numerous advantages over conventional systems and methods for identifying desirable subscribers. In an exemplary embodiment, an analyst uses subscriber-specific information to identify desirable subscribers rather than data obtained from small samples and then extrapolated to predict the behavior of similar subscribers. By identifying groups of desirable subscribers, an analyst is able to bring efficiency to the process of targeting consumers or other subscribers. The process of targeting subscribers in an exemplary embodiment is more efficient that conventional approaches because rather than targeting large groups of subscribers in an attempt to deliver the content to the subset who may be desirable, the content is either delivered to the same number of desirable subscribers for less cost or to a larger number of desirable subscribers for the same cost. Less desirable subscribers do not receive the content, and consequently content providers do not pay the cost for delivering content to the less desirable subscribers.

According to some of the embodiments offers further advantages to content providers and advertisers. In an exemplary embodiment, a content provider, advertiser, provider of goods and/or services, or other user has the ability to compare subscriber purchases of complementary and/or competitive products. The ability to perform the comparison helps the provider determine the relative strengths and/or weaknesses of the provider's offering.

Also, in an exemplary embodiment, the user gains the ability to correlate actions, such as purchases, with content viewed by a specific subscriber. For example, if a subscriber purchases a car within two days of viewing a targeted advertising, the provider may be able to make certain conclusions about the effectiveness of the advertisement.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

The above and other embodiments, objects, uses, advantages, and novel features are more clearly understood by reference to the following Description taken in connection with the accompanying figures, wherein:

FIG. 5 is a table illustrating the programming viewed by the subscriber during the period shown in FIGS. 3A, 3B, and 4 according to some of the embodiments.

FIG. 6 is a flowchart illustrating the process for identifying a desirable subscriber according to some of the embodiments.

FIG. 7A is a table illustrating a subscriber information database according to some of the embodiments.

FIGS. 7B and 7C are tables illustrating probability calculations performed on the data in the table in FIG. 7A according to some of the embodiments.

DESCRIPTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying some of the embodiments of this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing some of the embodiments of this invention. Those of ordinary skill in the art further understand that the exemplary hardware, software, processes, methods, and/or operating systems described herein are for illustrative purposes and, thus, are not intended to be limited to any particular named manufacturer.

Exemplary embodiments provide systems and methods for utilizing information relating to a subscriber to identify the subscriber as desirable. According to some of the embodiments, a content-access information database includes viewing information for a subscriber. A subscriber attribute database includes additional data about the subscriber. A merge processor combines this information, using a key, such as the subscriber's social security number, to create a subscriber information database. A data analyzer, such as a data-mining application, provides tools for searching the subscriber database or to identify desirable subscribers. The data analyzer may provide a tool that allows a content provider to correlate content-access information, such as television viewing habits, and other subscriber information to identify desirable subscribers.

Figure 1:
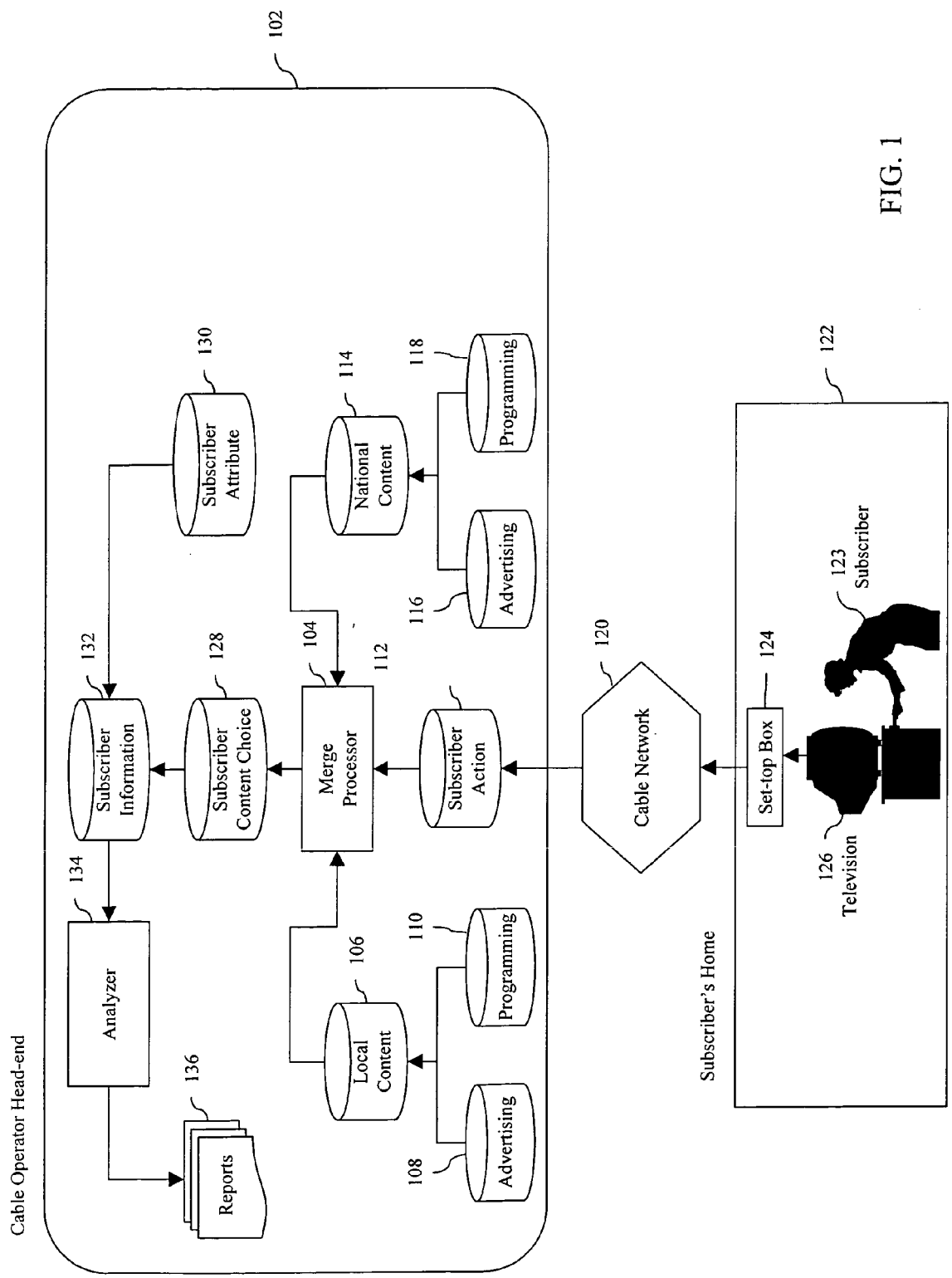
FIG. 1 is a diagram of an exemplary operating environment according to some of the embodiments.

FIG. 1A is an exemplary operating environment for identifying one or more desirable subscribers. As illustrated in FIG. 1A, a cable operator's head-end facility 102 includes a merge processor 104, which is in communication with a plurality of databases. These databases include a local-content database 106, a subscriber-action database 112, and a national-content database 114. The merge processor 104 is programmed to receive and merge data from the two databases 112, 114.

The local-content database 106 includes information from the advertising 108 and programming 110 databases. The advertising database 108 including information related to local advertising produced and/or provided by the cable operator or other local source. Likewise, the programming database 110 includes information related to locally produced and/or provided programming. The advertising database 108 includes attributes of advertisements, such as, for example, the advertiser, producer, brand, product type, length of the content, and other descriptive information. The programming database 110 includes similar information related to programming, including the producer, type of programming, length, rating, and other descriptive information. The local-content 106, programming 108, and advertising 110 databases include a date-time identifier, which indicates when a program or advertisement has been provided. The date-time indicator provides a key value for merging various databases with one another.

According to the exemplary embodiments of FIG. 1A, the cable operator head-end 102 also includes a national-content database 114. The national-content database 114 includes information from an advertising database 116 and a programming database 118. The information contained in each of these respective databases is similar to that contained in the local advertising 108 and programming 110 databases. However, the content is produced for a national audience and subsequently provided to the cable operator. The national-content 114, programming 118, and advertising 116 databases also include a date-time identifier.

The cable operator head-end 102 also includes a subscriber-action database 112. The subscriber-action database 112 includes the actions taken by subscribers while viewing television sets. For example, subscriber-action database 112 is in communication with cable network 120. A processor (not shown) in cable network 120 receives any subscriber actions transmitted via cable network 120 and inserts the actions as records in subscriber-action database 112. Also in communication with cable network 120 is a set-top box 124, which is installed in a subscriber's home 122. Also located in subscriber's home 122 is a television (TV) 126. As a subscriber 123 makes viewing choices on TV 126 via set-top box 124, these choices or actions are transmitted via a processor (not shown) in cable network 120 to subscriber-action database 112.

The subscriber-action database may include a clickstream database. A clickstream database is common in Internet monitoring applications. Each time a web-browser user clicks on a link in a web page, a record of that click is stored in a conventional clickstream database. A database that includes similar information for television viewers is disclosed in U.S. Pat. No. 6,983,478, entitled "Method and System for Tracking Network Use" that was filed on Feb. 1, 2000, by Edward R. Grauch, et al., and of which is hereby incorporated by reference. In the database described, each action taken by a television subscriber 123, such as "channel up" and "channel down" are stored in a database with a date-time stamp to allow tracking of the television subscriber's actions.

In the exemplary embodiments of FIG. 1A, a merge processor 104 receives information from the local-content 106, national-content 114, and subscriber-action 112, databases and merges the data based on date-time attributes of the data. For example, a detail record in the subscriber-action database 112 indicates that a subscriber's set-top box 124 was tuned to channel 12, a National Broadcasting Company (NCB) affiliate. A record in the national-content database 114 indicates that at the same point in time, NCB was broadcasting a Professional Golf Association (PGA) tournament. A record in the local-content database 106 further indicates that the cable provider preempted the PGA tournament to broadcast an infomercial for real estate investment strategy video. The merge process 104 receives information from each of these sources and determines that at the point in time of interest, the subscriber 123 was watching the infomercial. The merge processor stores the resultant data in the subscriber content-choice database 128. In some of the embodiments, the merge processor collects information from the various databases rather than receiving it. For example, a program on the merge processor 104 includes instructions for connecting to the various databases and extracting data from each one.

According to other exemplary embodiments, the subscriber content-choice database 128 includes merged information for a period of time and for a plurality of subscribers. For example, a program provider may wish to track the popularity of a program for several thousand subscribers for an entire month. Another provider may be interested in analyzing the seasonal differences in subscriber viewing behaviors.

Although FIG. 1A illustrates a cable network having a two-way digital cable network; various other cable network configurations may also be utilized. For example, the subscriber's home 122 may receive cable service via a digital one-way cable system. In such a system, set-top box 124 may communicate subscriber actions to subscriber-action database through a modem and telephone connection periodically. In other exemplary embodiments, subscriber 123 receives content through a digital subscriber line (DSL) from a DSL provider. In a DSL system, the set-top box 124 is able to perform two-way communications and can therefore transmit subscriber actions to subscriber-action database 112 directly. Further exemplary embodiments illustrating other content distribution networks (e.g., internet protocol networks) are described below in reference to FIG. 1B.

Although FIG. 1A illustrates the various databases and merge processor 104 are located in the head-end facility 102, alternative exemplary embodiments include other configurations, such as, the databases and merge process 104 integrated within the set-top box 124 or as software residing within a television network's facility (not shown). The data may be captured and analyzed by programming and advertising producers or distributors or may be utilized within a subscriber's set-top box 124 to provide advanced services tailored to the subscriber 123.

The cable operator head-end facility 102 also includes a subscriber attribute database 130. The subscriber attribute database 130 includes information about the subscriber, including, for example, demographic information, a purchase history, and questionnaire responses. The demographic information may include the profession of the subscriber, a property ownership history of the subscriber, the age, income, marital status, and other information useful in analyzing a subscriber's behavior. The data in the subscriber attribute database 130 may exist at various levels. For example, in some of the embodiments, the subscriber attribute database includes a purchase history of products, which are complementary or competitive to those of providers who analyze the data.

The cable operator head-end facility 102 also includes a subscriber information database 132. The merge processor 104 merges information from the subscriber content choice 128 and subscriber attribute database 130 to create records in the subscriber information database 132. The records in the databases are merged using a key attribute of a subscriber, such as the subscriber's social security number.

An analyzer 134 provides tools to a provider or other user to identify desirable subscribers in the subscriber information database 132. The analyzer 134 may include various types of tools, including tools that search the subscriber information database 132 automatically and tools that allow the user to perform manual searches. For example, the analyzer 134 may include a simple report creator that allows the user to search the subscriber information database, perform filtering and sorting, and print the results. For example, in the illustrated exemplary embodiments, the analyzer 134 automatically creates reports 136. The reports include summary and detailed information correlating subscriber content-access history and other attributes, such as a purchase history.

The analyzer 134 may include more complex tools such as an online analytical process application or multidimensional database. In an exemplary embodiment, analyzer 134 includes a data-mining application. A data-mining application allows a user to derive new information or discover new patterns in existing datasets. In another exemplary embodiment, analyzer 134 includes a combination of these tools so that a provider can make the best use of the data.

For example, a data-mining application on the analyzer 134 produces reports 136, illustrating influences and affinities within the subscriber information database 132. Influences indicate cause-and-effect relationships between various data elements. Affinities describe groupings of data or data that occur under the same circumstances. For example, a subscriber who accesses certain content (e.g., media content, Internet content, and other distributed content) may also be likely to purchase a certain brand of soft drink. The accessed content and the soft drink brand share an affinity or inherent similarity. The data-mining application provides additional reports 136, which detail anomalies in the data, such as a specific demographic group purchasing goods generally aimed at a completely different demographic group. For example, generally television viewers in demographic group 1 tend to view nature shows almost exclusively. However, based on a data-mining report, a majority of these same television viewers watch Show A, which is aimed a science fiction show. Using this information, advertisers now know to advertise during both nature shows and during Show A.

According to an exemplary embodiment, the various databases and merge processor 104 are located in the head-end facility 102. In other exemplary embodiments, the databases and merge processor 104 exist as software within the set-top box 124 or as software residing within a television network's facility (not shown). The data may be captured and analyzed by programming and advertising producers or distributors or may be utilized within a subscriber's set-top box 124 to provide advanced services tailored to the subscriber.

Figure 2:
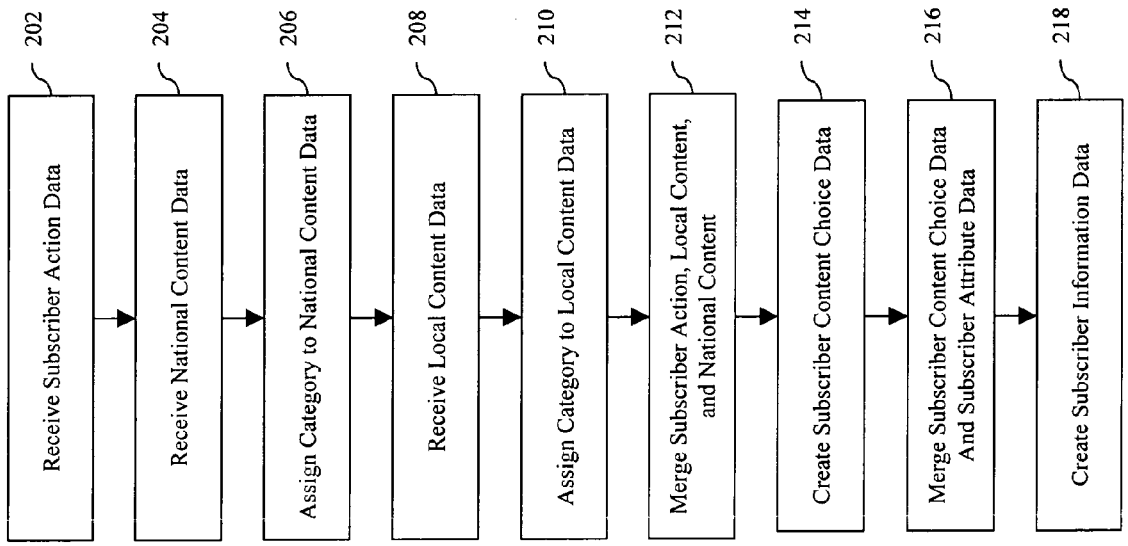
FIG. 2 is a flowchart illustrating a process implemented to merge various data sources according to some of the embodiments.

FIG. 2 is a flowchart illustrating the general process the merge processor (shown as reference numeral 104 in FIG. 1A) implements to categorize and merge data from the various databases in an exemplary embodiment. FIGS. 3-7 illustrate the process in greater detail.

Referring to FIG. 2, merge processor receives subscriber action data from the subscriber-action database (112) 202. Subscriber action data may include data indicating that the subscriber 123 viewed an alternate data source for a period of time. For example, the subscriber 123 may view video from a VCR or DVD or other video source for a period of time. This video source supersedes both national and local-content in the subscriber content-choice database 128.

The merge processor also receives data from the national-content database (114) 204. National-content data includes data describing media, such as programming and media, supplied by national providers. The merge processor next assigns a category or genre to the national-content data 206. A genre is a specific type of category used in relation to artistic compositions, and genre and category are used interchangeably herein. The merge processor (104) assigns categories to content based on attributes of the content. For example, a program has a name and a creation date. The name of the program is, "Wake Forest University vs. Duke University Basketball Game," and a creation date equal to the current date. The merge processor (104) uses logic in a computer program to determine that the program should be categorized as a "Live Sporting Event." The merge processor (104) may assign multiple categories to a single program, such as "Basketball," "Sports," "College-Related Programming," or some other broad descriptive term.

The merge processor also receives data from the local-content database (106) 208. The merge processor (104) then assigns a category to the local-content data 210 in a manner similar to the process of assigning a category to national-content data.

Once the merge processor has assigned a category to data in each of the content databases, the merge processor merges the categorized content data, national and local, with data from the subscriber-action database (112) 212 and creates records with the combined data in the subscriber content-choice database (128) 214. Since the content data was categorized prior to the merge process, the data in the subscriber content-choice database 214 retains the assigned categories. Therefore, data in the subscriber content-choice database 214 can be sorted, filtered, reported, and used for various other processes, which utilize groupings of the data.

The subscriber content-choice database 128 may be implemented in various ways. For example, the database 128 may simply be a number of tables in a relational database. To simplify the process of querying the data, the database may include an online analytical processing tool, such as a multidimensional database.

Figure 3A:
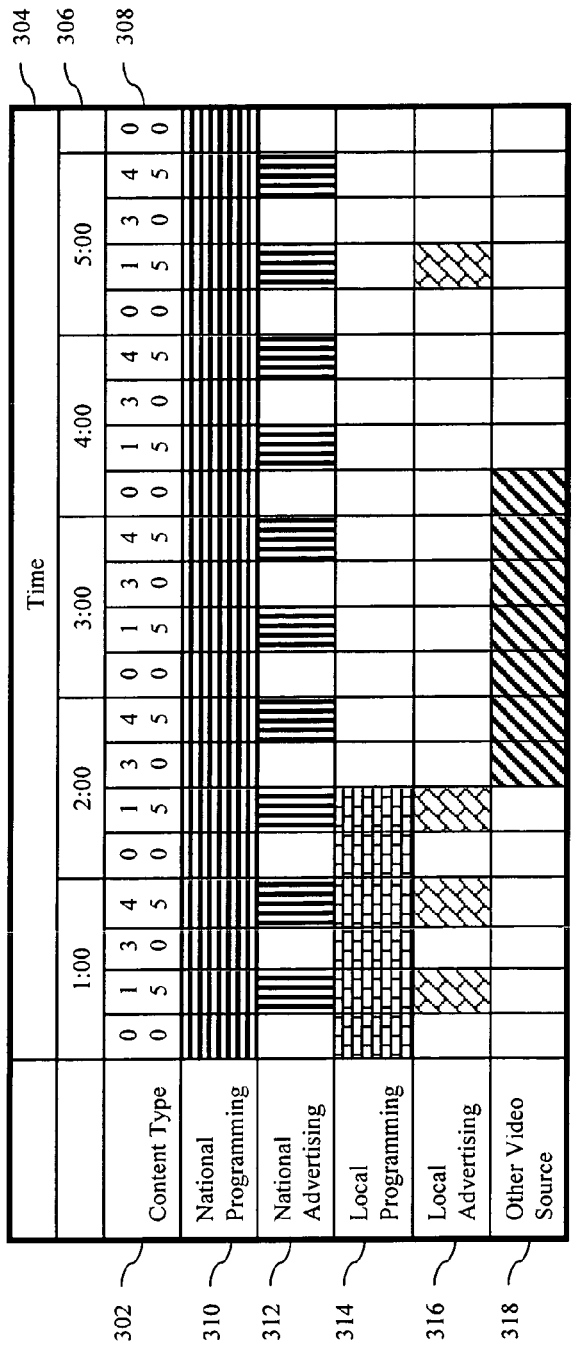
FIG. 3A is a table illustrating various sources of programming and advertising content available to a subscriber during a period of time according to some of the embodiments.
Figure 3B:
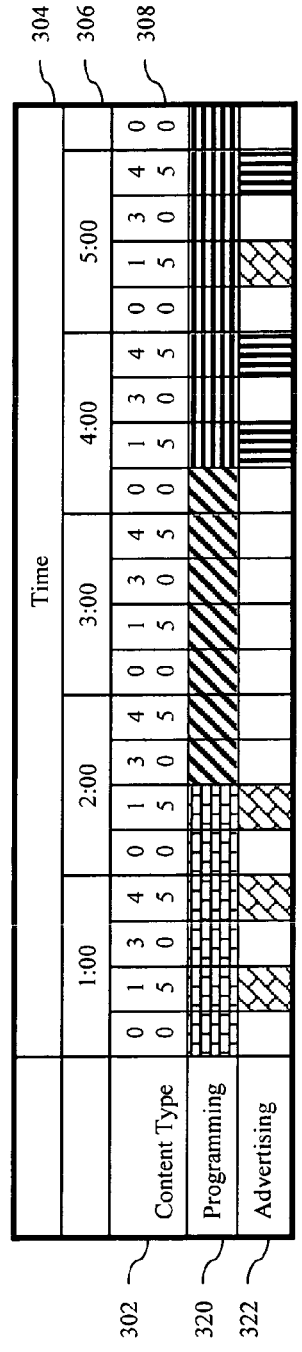
FIG. 3B illustrates content displayed on a subscriber's television during a period of time according to some of the embodiments.
Figure 4:
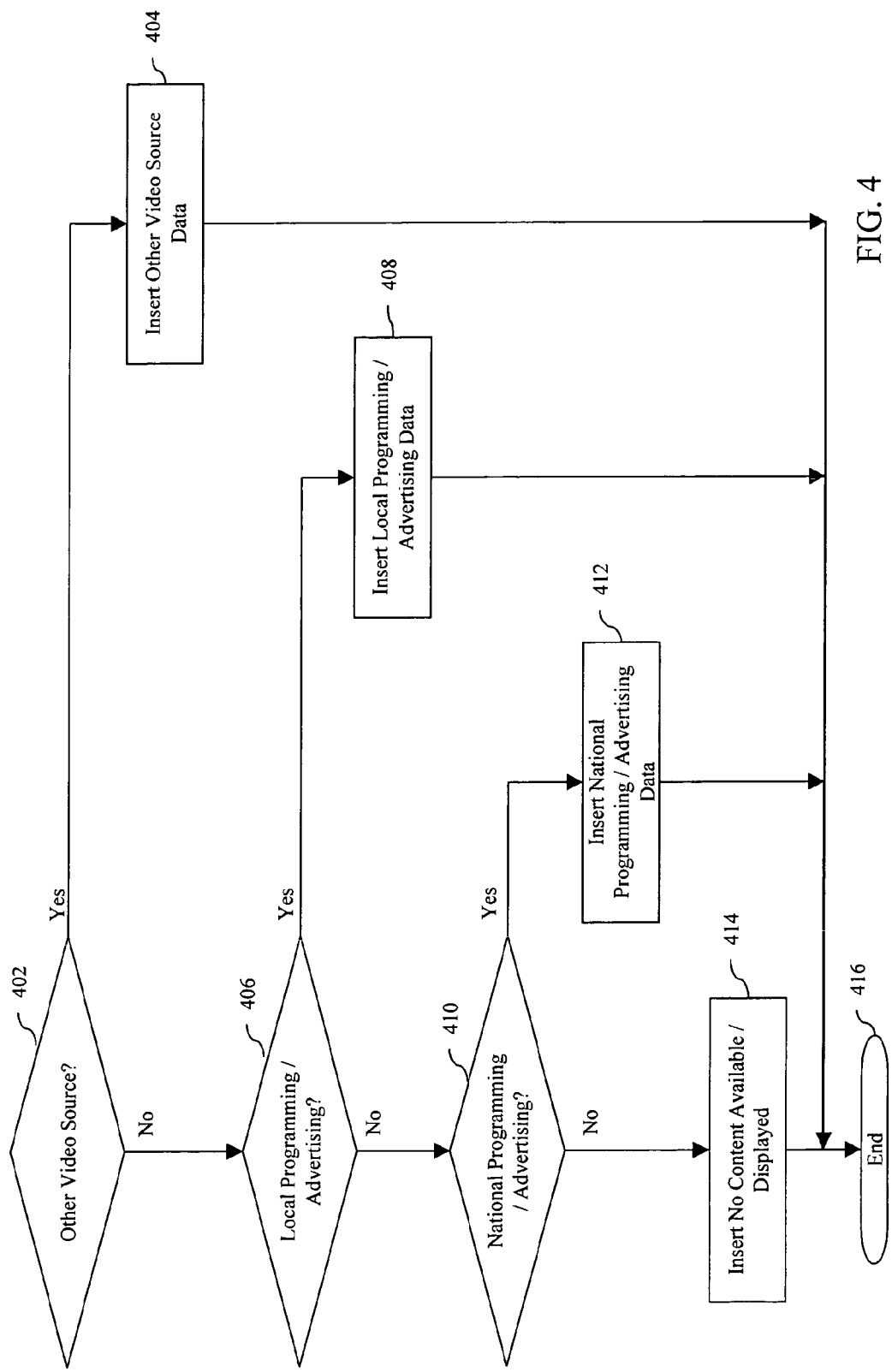
FIG. 4 is a flowchart illustrating the process of merging the data shown in FIG. 3A to create the merged data shown in FIG. 3B according to some of the embodiments.

FIG. 3A illustrates the sources of programming and advertising content available to the subscriber 123 while the set-top box 124 is tuned to a single channel. FIG. 3B illustrates the content displayed on the TV. FIG. 4 is a flowchart illustrating the process of merging the various content types shown in FIG. 3A to determine the content displayed on a particular channel.

FIG. 3A includes a Content Type column 302. The various content types displayed in the Content Type column 302 are show in relation to Time 304. Time 304 in FIG. 3A is divided into hour 306 and quarter-hour 308 segments. FIG. 3A represents a simplistic scenario in which set-top box 124 is tuned into a single channel. Therefore, the Content Type 302 column includes five types of content: National Programming 310, National Advertising 312, Local Programming 314, Local Advertising 316, and Other Video Source 318. In order to present a simplified view of the available content types during the period, several content types overlap, when in reality, they would actually occur in series. For example, National Programming 310 and National Advertising 312 do not occur at the same time, but it is likely that programming and advertising both would be broadcast for at least some period of time during the fifteen minute periods of overlap shown in FIG. 3A. For example, during a television program provided by a broadcast network, a two or three-minute break occurs approximately every fifteen minutes. Therefore, a fifteen-minute period in which a three-minute break occurs will include twelve minutes of programming and three minutes of advertising.

As shown in FIG. 3A, multiple types of content may be provided during any period of time. The fact that the content is provided does not indicate that it is available on the set-top box (124) or that the subscriber 123 is viewing the content. For example, in the embodiment shown, the cable provider provided National Programming 310 continuously throughout the period. The provider provided National Advertising 312 approximately every 15 minutes during the same period. Also, the cable provider provided Local Programming 314 from 1:00 until 2:30, and Local Advertising 316 approximately every 15 minutes during that period. The cable provider subsequently provided Local Advertising 315 during the period beginning at 5:15. Also during the period shown in FIG. 3A, the subscriber 123 viewed input from the Other Video Source 318, e.g., VCR or DVD, from 2:30 until 4:15.

FIG. 4 illustrates exemplary process for determining which programming is displayed on the subscriber's television during any specific period of time and inserting that data into the subscriber content-choice database 128 if the subscriber 123 is viewing that channel. Although various sources of content, such as a cable TV channel or a DVD movie, may be available to the subscriber (123) during any period of time, the subscriber (123) generally views only one source of programming or advertising at any one time. In addition, a content provider, such as a cable operator, makes determinations regarding which content will be available via a communications channel.

According to an exemplary embodiment, a computer program executing on merge processor (104) processes the potentially viewable data sources as a hierarchy. The program first determines, using information in the subscriber-action database (112), whether the subscriber (123) was viewing another video source, such as a VCR or DVD 402. If so, the program inserts data describing the other video source 404 into the subscriber content-choice database (128), and the process ends 416.

If the subscriber (123) was not viewing an alternate source of video and was tuned to a particular channel, then the subscriber (123) was viewing the content provided by the cable operator on that channel. To determine what content was provided by the cable provider, the program executing on the merge processor (104) determines whether the cable provider was providing local programming or advertising during the period of time 406 by accessing the local-content database (106). If so, the program inserts data describing the local programming or advertising 408 into the subscriber content-choice database (128), and the process ends. If the cable provider was not providing local programming or advertising, the program determines whether or not the provider was providing national programming or advertising 410 by accessing the national-content database (114). If so, the program inserts data describing the national programming or advertising 412 into the subscriber content-choice database (128), and the process ends 416.

If the program determines that the subscriber 123 was not viewing another video source and the provider was providing no content, the program either inserts a record in the subscriber content-choice database 128 indicating that no content was available during the specific period of time or inserts no data at all 416. For example, if TV 126 is left on after a broadcaster ends broadcasting for the rest of the day, no content is available after the broadcaster ceases broadcasting, so either a record indicating the lack of content is inserted or no data is inserted.

It is important to note that in an exemplary embodiment, the process illustrated in FIG. 4 is repeated for each period of time that is of interest for analyzing the data. The result of the process is plurality of records describing a subscriber's viewing patterns during a period of time. In some of the embodiments, the subscriber content-choice database (128) includes data from a plurality of subscribers as well. The databases and processor (104) in such an embodiment are configured appropriately to process the anticipated volume of data.

According to the exemplary embodiments shown in FIGS. 3A and 3B, the process is repeated for each quarter hour. In other embodiments, the time period may be divided into small increments, such as tenth-of-a second increments.

FIG. 3B illustrates the result of merging the data records shown in FIG. 3A using the process illustrated in FIG. 4. As in FIG. 3A, FIG. 3B is a simplistic view of this data, including the Content Type 302 and the various slices of time 304, 306, 308. In the table shown in FIG. 3B, the Content Type column 302 includes only a Programming 320 and an Advertising 322 row.

As shown in FIG. 3A, during the period from 1:00 until 2:30, the cable provider provides local programming and advertising 312, 314. The process of FIG. 4 determined that the subscriber 123 was viewing no other video source 318, and therefore, the program inserts data into the subscriber content-choice database 128 related to local programming and advertising 320, 322. During the period beginning at 2:30 and ending at 4:15, the subscriber 123 viewed video from another source 318. Therefore, the program inserts data related to the other source for this time period. During the period from 4:15 until 5:15, the provider provided national programming and advertising with the exception of the period from 5:16 until 5:30, during which local advertising as provided. The program inserts this data into the subscriber content-choice database.

FIG. 5 is a table illustrating exemplary programming that the subscriber 123 viewed during the period shown in FIGS. 3A and 3B. As with FIGS. 3A and 3B, the table includes a Time section 502 and a Content section 504. The Time section 502 is divided into hour and quarter-hour segments.

According to FIGS. 3A and 3B, between 1:00 and 2:30, the subscriber 123 viewed local programming and advertising. By accessing the local-content database (106), the merge processor (104) determines that the local programming consisted of a NCAA (National Collegiate Athletic Association) basketball game and local advertising 506.

According to FIGS. 3A and 3B, during the period from 2:30 until 4:15, the subscriber (123) viewed a DVD 508. The merge processor (104) determines that the DVD was a science fiction DVD by extracting data from the subscriber-action database (112).

And according to FIGS. 3A and 3B, between 4:15 and 5:15, the subscriber (123) viewed national content and advertising, with the exception of the period between 5:15 and 5:30 during which the cable operator inserted a local advertisement segment in the content stream in place of the national content 510. By accessing the national-content database (114), the merge processor (104) determines that the national content viewed by the subscriber (123) was an NBA (National Basketball Association) basketball game.

According to exemplary embodiments, an analyst evaluates the data shown in FIG. 5 to determine preferences and viewing habits of the subscriber (123). In some of the embodiments, the analyst is a computer program executing on a processor (not shown). The analyst also attempts to extrapolate the data in order to project purchase habits of the subscriber 123. In order to evaluate the data shown in FIG. 5, the analyst begins by assigning a category or genre to the programming. For example, during the period between 1:00 and 2:30, the subscriber 123 viewed a NCAA basketball game 506. An analyst would assign various types and levels of categories to the game, such as basketball, college athletics (type of program), college name, and conference. The analyst may also note that sometime between 2:15 and 2:30, a PGA golf tournament began, and the subscriber 123 started a DVD movie. This might indicate that the subscriber 123 did not enjoy watching golf on TV. During the same period, the subscriber 123 also watched several advertisements. The analyst categorizes these as well. The analyst repeats the process of categorization of programming and advertising for the remainder of the data 508, 510.

By categorizing content using multiple category types and multiple levels, the analyst is able to provide an abundance of information to programming and advertising producers, and providers, as well as to the product owners and manufacturers who pay to have the ads produced and distributed. Categorization in this manner also provides the analyst with multiple perspectives from which to analyze the data.

According to other exemplary embodiments, the analyst may look for patterns or correlations between multiple programs and advertisements or between categories of multiple programs and advertisements. In correlating data, the analyst is seeking causal, complementary, parallel, or reciprocal relations between various occurrences of data. For example, in the embodiment shown in FIG. 5, the subscriber 123 viewed a basketball game, a science fiction movie, and another basketball game. An analyst may correlate this data and find that the subscriber 123 generally watches primarily sports broadcasts, and otherwise watches content from video sources in the home. The analyst may also perform a probably analysis to determine the likelihood that a subscriber 123 will watch a particular category or genre of show if presented with the opportunity.

Although only a brief period of time is shown in the Figures, the subscriber content-choice database includes data recorded continually over many days. By analyzing various days and time periods, an analyst can determine a subscriber's time0 of-day viewing patterns as well as the subscriber's patterns of viewing duration. For example, an analyst may determine whether the subscriber 123 tends to view the entirety of a program or of an advertisement.

Determining the duration of viewing of advertisements is important to advertisers. If a subscriber 123 initially views an entire advertisement but subsequently, views only a small portion of the advertisement, then the advertiser may need to reschedule the advertisement so that it runs less frequently, or replace the advertisement altogether. Also, if subscribers viewing a particular category of programming generally view ads in their entirety, but other viewers do not, the advertiser may want to focus resources on presenting the advertisement to these viewers.

Beyond analyzing ads in general, advertisers may also desire information related to specific ads or even of a competitor's ads. Using the information, the advertiser may be able to determine the relative strengths and weaknesses of the advertiser's own strategy versus a competitor's strategy.

In some of the embodiments, various indirect methods are also used to determine the popularity of programming and the effectiveness of advertising. For example, advertising effectiveness is often measured in terms of viewer attitudes and subsequent viewer actions, such as purchases, inquiries, behavior changes, and other actions. Methods of obtaining these indirect measures include: focus group tests, post-advertising surveys, questioning whether an advertisement was viewed, remembered and possible impact, and measures of product purchases or other indirect results that may indicate whether or not an advertising campaign has been successful. In an exemplary embodiment, additional databases store the data derived through these indirect methods. The merge processor 104 combines this data with the data in the subscriber content-choice database 128 to provide additional information to analysts and content providers.

FIG. 6 is a flowchart illustrating an exemplary process for identifying a desirable subscriber after data has been merged into the subscriber information database 132. By using the process illustrated in FIG. 6, an advertiser, programmer, distributor, or other content provider identifies subscribers to target. A content provider may carry out the process illustrated in FIG. 6 manually, allow the analyzer 134 to carry out the process automatically, or may use some combination of the two.

According to an exemplary automated process, the analyzer 134 determines the relevant criteria for determining which subscribers should receive a targeted advertisement 602. For example, a product may be associated with a specific demographic group. Also, past purchasers of a product may be much more likely to purchase the same product in the future than people who have never before purchased the product.

The advertiser next identifies the relevant information in the subscriber information database (132) 604. For example, if the product is associated with a demographic group, and specific content, such as a television program, is also associated with the demographic group, the analyzer 134 identifies the viewing history for a subscriber as the relevant information in the database 134. If purchases of the product relate to past purchases, the analyzer 134 identifies a purchase history in the database 132 as relevant.

The analyzer 134 extracts the relevant data from the database (132) 606. Extracting the information may include creating a report, spreadsheet, or other format, which can be used by the analyzer 134 or a content provider to examine the data to identify desirable subscribers.

In the exemplary process shown in FIG. 6, the analyzer 134 next determines the probability that a subscriber will purchase Product A based on the first attribute 608 and on the second attribute 610. FIGS. 7A and 7B illustrate an example of how the probability calculation may be performed.

The table of FIG. 7A illustrates a data extract 702 from a subscriber information database 132, resulting from the extract step 606 in FIG. 6. In the exemplary embodiment shown, the extract 702 includes 3 columns, viewing history 704, city of residence 706, and a flag denoting whether or not the subscriber has purchased product A 708. The advertiser uses the data from the extract 702 to determine the probability that a subscriber with a particular viewing history 704 or city of residence 706 has purchased product A 708.

FIGS. 7B and 7C are tables illustrating the result of the probability calculations by viewing history and city respectively. The table 710 shown in FIG. 7B includes two columns: Viewing History 712 and Probability expressed as a percentage 714. Probability 714 is the probability, based on the data in the extract 702, that a subscriber who viewed the program shown in the Viewing History column 712 will purchase Product A. For example, in the data extract 702, two out of three subscribers who watched Show 1 purchased Product A. Therefore, absent any other influences, the probability that a subscriber who views Show 1 will purchase Product A is 66.7%.

FIG. 7C includes a table 720, illustrating a similar calculation for city of residence. The table 720 includes a City column 722 and a Probability column 724. Based on the data shown, the probability that a subscriber who resides in city A will purchase Product A is 66.7% based on the data extract 702 shown n in FIG. 7A.

Referring again to FIG. 6, once the advertiser has determined the probability for each of the attributes, the advertiser determines which subscribers are to be targeted 612. Since the advertiser believes that it is best to target subscribers who have purchased Product A in the past, the advertiser targets subscribers in the following order: (1) views of Show 1 and/or residents of city A (tie), (2) viewers of Show 2, (3) residents of city B or C (tie), and (4) viewers of Show 3.

The example illustrated by FIGS. 7A-C relies on only two variables. In further exemplary embodiments, a user (e.g., an advertiser) relies on many additional variables to determine the most effective and efficient use of advertising budget.

Exemplary embodiments of this invention provide great value to content providers. As a result, content providers are willing to pay for the outputs derived from the various reports and analysis. The content providers may be billed a flat subscription-type rate for access to all information received, or they may pay for each report and/or analysis that they request.

Further exemplary embodiments include a computer-readable medium, having computer-readable instructions for assigning a category and merging the subscriber action and media-content information. Another exemplary embodiment includes computer-readable instructions for correlating multiple subscriber actions occurring over a period of time, such as an online analytical processing application.

A computer-readable medium includes an electronic, optical, magnetic, or other storage or transmission device capable of providing a processor, such as the processor in a web server, with computer-readable instructions. Examples of such media include, but are not limited to, a floppy disk, CD-ROM, magnetic disk, memory chip, or any other medium from which a computer processor can read. Also various other forms of computer-readable media may transmit or carry instructions to a computer, including a router, private or public network, or other transmission device or channel.

While several exemplary implementations of embodiments of this invention are described herein, various modifications and alternate embodiments will occur to those of ordinary skill in the art. For example, the architecture and programming of the system may be modified. Or, a variety of different manufacturers' servers, set top boxes (including other media delivery devices), and/or databases may be configured in order to implement exemplary embodiment of this invention. Further, the exemplary identification codes and allocated sizes show in the tables and described herein may also be greatly modified. Accordingly, this invention is intended to include those other variations, modifications, and alternate embodiments that adhere to the spirit and scope of this invention.

What is claimed is:

1. A method, comprising:
   storing in memory clickstream data describing commands entered by a user during programming;
   retrieving content information describing the programming;
   merging by a processor the clickstream data with the content information to generate data describing an event timeline;
   retrieving a purchase history associated with the user;
   comparing the data describing the event timeline to the purchase history;
   determining a common attribute between the data describing the event timeline and the purchase history;
   retrieving an advertisement associated with the common attribute; and
   sending the advertisement to an address associated with the user.

2. The method according to claim 1, wherein determining the common attribute comprises determining a common demographic between the data describing the event timeline and the purchase history.

3. The method according to claim 1, wherein determining the common attribute comprises determining a number in common between the data describing the event timeline and the purchase history.

4. The method according to claim 1, wherein determining the common attribute comprises determining a brand name in common between the data describing the event timeline and the purchase history.

5. The method according to claim 1, wherein determining the common attribute comprises determining a product name in common between the data describing the event timeline and the purchase history.

6. The method according to claim 1, wherein determining the common attribute comprises determining a type of product in common between the data describing the event timeline and the purchase history.

7. The method according to claim 1, further comprising comparing a date and time between the data describing the event timeline and the purchase history.

8. The method according to claim 1, wherein retrieving the purchase history comprises retrieving a credit card record.

9. A system, comprising:
   a processor; and
   memory storing code that when executed causes the processor to perform operations, the operations comprising:
   receiving clickstream data describing commands entered by a user during programming;
   receiving content information describing the programming;
   merging the clickstream data with the content information to generate data describing an event timeline;
   retrieving a purchase history associated with the user;
   comparing the data describing the event timeline to the purchase history;
   determining a common attribute between the data describing the event timeline and the purchase history;
   retrieving an advertisement associated with the common attribute; and
   sending the advertisement to an address associated with the user.

10. The system according to claim 9, wherein the operations further comprise determining a common demographic between the data describing the event timeline and the purchase history.

11. The system according to claim 9, wherein the operations further comprise determining a number in common between the data describing the event timeline and the purchase history.

12. The system according to claim 9, wherein the operations further comprise determining a brand name in common between the data describing the event timeline and the purchase history.

13. The system according to claim 9, wherein the operations further comprise determining a product name in common between the data describing the event timeline and the purchase history.

14. The system according to claim 9, wherein the operations further comprise determining a type of product in common between the data describing the event timeline and the purchase history.

15. The system according to claim 9, wherein the operations further comprise comparing a date and time between the data describing the event timeline and the purchase history.

16. The system according to claim 9, wherein the operations further comprise retrieving a credit card record as the purchase history.

17. A computer-readable memory on which is encoded instructions that when executed cause a processor to perform operations, the operations comprising:
   receiving clickstream data describing commands entered by a user during programming;
   receiving content information describing the programming;
   merging the clickstream data with the content information to generate data describing an event timeline;
   retrieving a purchase history associated with the user;
   comparing the data describing the event timeline to the purchase history;
   determining a common attribute between the data describing the event timeline and the purchase history;
   retrieving an advertisement associated with the common attribute; and
   sending the advertisement to an address associated with the user.

18. The computer-readable memory of claim 17, wherein the operations further comprise determining a common demographic between the data describing the event timeline and the purchase history.

19. The computer-readable memory of claim 17, wherein the operations further comprise determining a number in common between the data describing the event timeline and the purchase history.

20. The computer-readable memory of claim 17, wherein the operations further comprise determining a product name in common between the data describing the event timeline and the purchase history.

* * * * *